United States Patent
Quintero-Fuentes et al.

(10) Patent No.: US 11,785,972 B2
(45) Date of Patent: Oct. 17, 2023

(54) PROCESSING AID FOR EXTRUDABLE FOOD COMPOSITION

(71) Applicant: Frito-Lay North America, Inc., Plano, TX (US)

(72) Inventors: Ximena Quintero-Fuentes, Plano, TX (US); Carl Littrell, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 344 days.

(21) Appl. No.: 16/857,977

(22) Filed: Apr. 24, 2020

(65) Prior Publication Data

US 2021/0329953 A1 Oct. 28, 2021

(51) Int. Cl.
| | |
|---|---|
| *A23L 7/10* | (2016.01) |
| *A23P 30/25* | (2016.01) |
| *A23L 29/10* | (2016.01) |
| *C12J 1/00* | (2006.01) |

(52) U.S. Cl.
CPC .............. *A23L 7/198* (2016.08); *A23L 29/10* (2016.08); *A23P 30/25* (2016.08); *C12J 1/00* (2013.01); *A23V 2002/00* (2013.01)

(58) Field of Classification Search
CPC .......... A23P 30/25; A23L 7/198; A23L 29/10; C12J 1/00
See application file for complete search history.

(56) References Cited

U.S. PATENT DOCUMENTS

| | | | |
|---|---|---|---|
| 2,002,053 | A | 5/1935 | Doolin |
| 6,054,149 | A | 4/2000 | Hammond |
| 6,224,933 | B1 | 5/2001 | Bhaskar et al. |
| 6,586,031 | B1 | 7/2003 | Kelly |
| 2006/0150828 | A1 | 7/2006 | Quackenbush et al. |
| 2007/0154609 | A1 | 7/2007 | Li et al. |
| 2009/0191308 | A1 | 7/2009 | Gingras et al. |
| 2015/0315614 | A1* | 11/2015 | Nakano ...................... C12J 1/04 435/244 |
| 2016/0128362 | A1 | 5/2016 | Morales-Alvarez et al. |
| 2017/0202262 | A1 | 7/2017 | Morales-Alvarez et al. |
| 2017/0223992 | A1 | 8/2017 | Morales-Alvarez et al. |

FOREIGN PATENT DOCUMENTS

JP H09163945 6/1997

OTHER PUBLICATIONS

Chang et al., "Effects of Acid Concentration and Extrusion Variables on Some Physical Characteristics and Energy Requirements of Cassava Starch," Braz. J. Chem. Eng. vol. 20, No. 2 (Jun. 2003).
"Applications and Description for Extrusion Cooking of Different Categories of Products," Barnard Health Care—Food Processing (Nov. 6, 2019).
Barrett et al., "Extrudate Cell Structure-Texture Relationships," Journal of Food Science, vol. 57, No. 5, pp. 1253-1257 (1992).
Barron et al., "The Effects of a Rice Based Emulsifier on Extruded Corn Meal," Food Protein R&D Center, Texas A&M University (Jun. 2016).
Natural Nu-Rice, Nutrition Analysis Sheet, (Mar. 22, 2017).
Nu-Rice, Product Specifications Sheet (Jan. 3, 2019).
International Search Report and Written Opinion dated Jun. 25, 2021 in PCT/US2021/022343.
International Preliminary Report on Patentability issued in PCT/US2021/022343 dated Oct. 25, 2022.

* cited by examiner

*Primary Examiner* — Katherine D Leblanc
(74) *Attorney, Agent, or Firm* — Barnes & Thornburg LLP; G. Peter Nichols

(57) ABSTRACT

A processing aid for an extrudable food composition includes from about 60% to about 99% by weight of at least one edible emulsifier and from about 1% to about 40% by weight of a short chain carboxylic acid. The extrudable food composition may include from about 80% to about 90% by weight of a raw material; from about 1% to about 18% by weight added moisture; from about 0.1% to about 3% of a processing aid, wherein the processing aid includes at least one edible emulsifier and at least one short chain carboxylic acid. The raw material is selected from one or more of corn meal, whole grain corn meal, rice, whole grain flour, rice pea, brown rice, wheat flour, whole wheat flour, pea flour, black bean, pinto bean flour, potato flour, and mixtures thereof.

1 Claim, No Drawings

PROCESSING AID FOR EXTRUDABLE FOOD COMPOSITION

BACKGROUND

A processing aid for extrudable food compositions includes at least one short chain carboxylic acid and at least one edible emulsifier.

In the formation of random collet products formed from cornmeal and produced by a rotary head extruder, it has been found that the crop has an impact on the production, particularly the length of the extruder runtime which may be reduced by encrustation (glazing) on the extruder rotor/stator. For example, it has been found that the season of the crop as well as the location of the crop may have an influence how long the extruder is able to run before encrustation becomes significant enough to require the process to be shut down so that the extruder can be cleaned. It would be desirable to provide a processing aid that addresses this issue.

SUMMARY

According to one aspect of the disclosure, a processing aid for extrudable food compositions comprises, consists essentially of, or consists of at least one short chain carboxylic acid and at least one edible emulsifier. In some aspects, the processing aid includes from about 1% to about 40% of short chain carboxylic acids and from about 60% to about 99% of the edible emulsifier. In other aspects, the ratio of emulsifier to short chain carboxylic acid may range from about 2:1 to about 40:1. Advantageously, it has been found that the combination of the at least one short chain carboxylic acid and the at least one edible emulsifier improves the run-time of extruders processing raw material that includes the described processing aid as compared to the run-time of extruders processing raw material that does not include the described processing aid.

The emulsifier may be selected from one or more of a rice extract, a rice bran extract such as the product marketed as Nu-Rice® from Ribus, lecithin, glycerol monostearate, mono- and di-glycerides and mixtures thereof.

The short chain carboxylic acids that are suitable are acetic acid, lactic acid, malic acid, citric acid, and mixtures thereof. In some instances, the acetic acid may be provided in the form of vinegar, which typically contains about 4-5% by weight acetic acid.

The processing aid may be incorporated with or added to a raw material and moisture to form an extrudable food composition. In this regard, the processing aid may be present in the extrudable food composition in an amount from about 0.1% to about 3%.

In another aspect, an extrudable food composition comprises, consists essentially of, or consists of a raw material, moisture, at least one short chain carboxylic acid, and an edible emulsifier. In this aspect, the extrudable food composition may include from about 80% to about 99% of a raw material, from about 1% to about 18% of added moisture, from about 0.1% to about 2.0% emulsifier and from about 0.01% to about 0.3% short chain carboxylic acid.

While the described processing aid has been demonstrated to be effective when the raw material is cornmeal, it is believed that the raw material may be selected from one or more of corn meal (cornmeal), whole grain corn meal, rice, whole grain flour, rice pea, brown rice, wheat flour, whole wheat flour, pea flour, black bean, pinto bean flour, potato flour, and other grain legumes or tubers whether in flour, powder or other granular form.

Raw materials comprising an inherent or intrinsic moisture between about 1.0% to about 18% may generally be used to form the described extrudable composition. The raw material may then be pre-moistened or pre-hydrated to achieve a desired moisture content level prior to introducing the extrudable composition into the extruder. In one embodiment, the raw materials comprise an inherent or intrinsic moisture content of between about 11% to about 12.5%. The raw materials may then be pre-hydrated, i.e., moisture is added so that the resulting raw material with added moisture includes from about 14.5% to about 18% moisture by weight.

In one embodiment, one or more raw materials may be pre-mixed, which may include mixing one type of raw material with water or with other raw materials with water for moistening. In this way, different materials can be moistened to the same approximate moisture level, for example.

The term "extrudable composition" refers to a composition that is mixed into a homogenous composition and prior to the composition being extruded.

Unless otherwise explicitly noted, all percentages in the disclosure refer to a percent by weight.

Description

The processing aid described in this application may provide particular benefits during the processing of random collet products that are made using a rotary head extruder, which will be described below to provide additional context to the inventive processing aid.

Rotary head extruders use two round plates to cook and gelatinize corn meal. One plate is rotating and the other is stationary, producing friction necessary to produce random collets. These extruders are high-shear, high-pressure machines, which generate heat in the form of friction in a relatively short length of time. No barrel heating is applied in rotary head extruders, as the energy used to cook the extrudate is generated from viscous dissipation of mechanical energy. There is no added water, heating element, or cooling element used within a rotary head extruder to control the temperatures. Instead, rotary head extruders use friction generated within the round plates (and not in the auger or screw zone) to cook the extrudate. There is no mixing and only a very limited compression at the auger of a rotary head extruder; specifically, only enough to convey the material in the gap areas within the barrel.

The shear is instead at the fingers, described below. While the auger zone helps transport materials to the die assembly, it cannot mix materials and is a poor conveyer of mixed materials and of certain ingredients, including very small ingredients such as powders or flours. Instead, it has been found that the rotary head extruder is generally limited to refined cereal meal formulations within a narrow range of particle size. Anything else often results in flow irregularities along the single auger, which turns into blockages in the extruder flow, leading to failure and stoppages of the extruder. In addition, the maximum in-feed throughput capacity may be limited to between about 360 about 540 lb./hr.

During the production of random collet products, pre-moistened cornmeal is gravity-fed through a hopper and into the extruder. The rotary head extruder includes two main working components that give the collets their twisted ("random") shapes: a single screw or auger and a rotary die assembly. The auger is housed in a cylindrical casing, or barrel, and includes an open feed section through which the cornmeal passes. In practice, the hopper feeds into an open feed section from above. The auger transports and compresses the cornmeal, feeding it to the rotary die assembly, where it is plasticized to a fluidized state in a glass transition process further described below.

The die assembly contains two metal round plates (for example, brass alloy): a stator (with the stationary plate) and a rotor (the rotating plate). Gelatinization of moisturized starchy ingredients takes place inside the concentric cavity between these metal plates. The stator is an assembly comprising a stator head section and a round stationary brass plate that acts as a die through which the gelatinized melt flows. The stationary plate has grooves that aid in the compression of cornmeal as the stator works together with the rotor. The rotor is a rotating plate comprising fingers and a nose cone. The nose cone channels the cornmeal towards the fingers and helps discharge the gelatinized cornmeal through the small gap between the rotor and stator. The action of the fingers creates the necessary condition of pressure and heat to achieve plasticization of the raw materials at approximately 260° F. to 320° F. (127° C. to 160° C.). Specifically, the fingers force cornmeal back into the grooves of the stator head, causing friction and compression of the cornmeal in the gap between the stator and the rotor. The facing on the rotor also helps to create heat and compression. Random extrusion may thus be characterized by a thermos-mechanical transformation of the raw materials brought about by the metal-to-metal interactions of the die assembly.

Several things happen within the die assembly during the random extrusion process. First, the cornmeal is subjected to high shear rates and pressure that generate most of the heat to cook the corn. Thus, unlike other extruders, most of the cooking takes place in the rotary die assembly of the rotary head extruder. As stated above, there is no added water or external heat used to control the temperatures within this extruder. Second, a rapid pressure loss causes the superheated water in the corn mass to turn to steam, puffing the cooked corn as it exits the die assembly. Third, the flow of cornmeal between one rotating plate and one stationary plate twists the expanding cornmeal leaving it twisted and collapsed in places, resulting in the characteristic product shape. The random collets exit the rotary head extruder circumferentially outward from the gap between the stator and rotor in a radial path from the center of the fingers. Cutter blades within a cutter assembly then cut off the collets that result from the expansion process of the stator-rotor interactions. The process is entirely unique, providing unsystematic, irregularly shaped collets and a texture distinct in its crunchiness, giving somewhat of a homemade effect.

During the processing of the cornmeal, it has been found that the cornmeal accumulates on the rotor, stator, or both which is exhibited by a glaze on those surfaces. As a result of the accumulation, it becomes increasingly difficult for the cornmeal to exit the extruder resulting in a failure of collet production, which causes production to be stopped while the rotor and stator are cleaned. Unfortunately, during the cleaning, despite due care, nicks are typically formed which lead to nucleation sites for the subsequent build-up of cornmeal during process and which leads to a shorted production run time as compared to new rotors and stators. One can appreciate that with such a cycle, the production run time may become increasingly shorter with the end result being replacement of the rotor and stator.

Advantageously, it has been found that the described processing aid composition is effective in lengthening the production run time and decreasing the accumulation of raw material (e.g., cornmeal) on the rotor and stator. According to one aspect, a processing aid for extrudable food compositions comprises, consists essentially of, or consists of at least one short chain carboxylic acid and at least one edible emulsifier. In some aspects, the processing aid includes from about 1% to about 40% of short chain carboxylic acids and from about 60% to about 99% of the edible emulsifier. In some embodiments, the processing aid consists essentially of from about 1% to about 40% of short chain carboxylic acids and from about 60% to about 99% of the edible emulsifier. In other embodiments, the processing aid consists of from about 1% to about 40% of short chain carboxylic acids and from about 60% to about 99% of the edible emulsifier.

In some embodiments, the processing aid comprises, consists essentially of, or consists of from about 5% to about 30% or from about 7% to about 20%, or from about 8% to about 15%, or from about 9% to about 11%, or about 10% of at least one short chain carboxylic acid. In these embodiments, the processing aid also comprises, consists essentially of, or consists of from about 70% to about 95%, or from about 80% to about 93%, or from about 85% to about 92%, or about 89% to about 91%, of about 90% of an edible emulsifier.

In other aspects, the ratio of emulsifier to short chain carboxylic acid in the processing aid may range from about 2:1 to about 40:1, or from about 3:1 to about 20:1 or from about 4:1 to about 16:1, or about 8:1.

The emulsifier may be selected from one or more of a rice extract, a rice bran extract such as the product marketed as Nu-Rice® from Ribus, lecithin, glycerol monostearate, mono- and di-glycerides and mixtures thereof.

The short chain carboxylic acids that are suitable are acetic acid, lactic acid, malic acid, citric acid, and mixtures thereof. In some instances, the acetic acid may be provided in the form of vinegar. One of skill will understand that vinegar exists with differing strengths of acetic acid from about 5% to about 30% (including 6%, 10%, 12%, and 20%) by weight acetic acid. In one aspect, vinegar having about 12% by weight acetic acid may be useful.

The processing aid may be incorporated with or added to a raw material and moisture to form an extrudable food composition. In this regard, the processing aid may be present in the extrudable food composition in an amount from about 0.1% to about 3%, or from about 0.2% to about 2%, or from about 0.3% to about 1%, or from about 0.4% to about 0.8% and in some instances from about 0.5% to about 0.6% by weight In another aspect, an extrudable food composition comprises, consists essentially of, or consists of a raw material, moisture, at least one short chain carboxylic acid, and an edible emulsifier. In this aspect, the extrudable food composition may include from about 80% to about 99% of a raw material, from about 1% to about 18% of added moisture, from about 0.1% to about 2.0% emulsifier and from about 0.01% to about 0.3% short chain carboxylic acid. In some embodiments, the extrudable food composition consists essentially of from about 80% to about 99% of a raw material, from about 1% to about 18% of added moisture, from about 0.1% to about 2.0% emulsifier and from about 0.01% to about 0.3% short chain carboxylic acid. In other embodiments, the extrudable food composition consists of from about 80% to about 99% of a raw material, from about 1% to about 18% of added moisture, from about 0.1% to about 2.0% emulsifier and from about 0.01% to about 0.3% short chain carboxylic acid.

While the described processing aid composition has been demonstrated to be effective when the raw material is cornmeal, it is believed that the raw material may be selected from one or more of corn meal (cornmeal), whole grain corn meal, rice, whole grain flour, rice pea, brown rice, wheat flour, whole wheat flour, pea flour, black bean, pinto bean flour, potato flour, and other grain legumes or tubers whether in flour, powder or other granular form.

Raw materials comprising an inherent or intrinsic moisture content between about 1.0% to about 18% may generally be used to form the described extrudable composition. In this regard, the raw material may be pre-moistened or pre-hydrated prior to introducing the extrudable composition into the extruder. In one embodiment, the raw materials comprise an initial moisture content of between about 10% to about 15%, or from about 11% to about 14%, or from about 12% to about 14%. Raw materials may be pre-hydrated to provide from about 14.5% to about 18% moisture by weight.

In one embodiment, one or more raw materials may be pre-mixed, which may include mixing one type of raw material with water or with other raw materials with water for moistening. In this way, different materials can be moistened to the same approximate moisture level, for example.

After or during the mixing or pre-mixing of raw materials and after or during the mixing of the raw materials (whether pre-mixed or not), the processing aid composition may be added and mixed with the raw material and moisture to form the above described extrudable composition.

Consistent with the above description, a method of forming random collets is contemplated, where the method includes the step of expanding the raw materials into a random collet products comprising a bulk density of between about 3.0 and 11 lbs./cu ft. or between 3.0 and 6.5 lb./cu ft. In one embodiment, an expanded and puffed food product comprises a bulk density of between about 4.5 and about 5.0 lbs./cu ft. A cutting step may also be used to cut the expanded and puffed food product to a desirable size.

The invention will now be further elucidated with reference to the following examples, which should be understood to be non-limitative. It should be appreciated by those of ordinary skill in the art that the techniques disclosed in the examples that follow represent ones discovered by the inventors to function well in the practice of the invention and thus, constitute exemplary modes. One of ordinary skill in the art, when viewing this disclosure, will appreciate that many changes can be made in the specific embodiments while still obtaining similar or like results without departing from the spirit and scope of the present invention.

EXAMPLE 1

An extrudable composition prepared from about 97% raw cornmeal (the cornmeal contained between about 11-14% intrinsic moisture) and about 3% added moisture was used as a control product. An exemplary extrudable composition was prepared from about 96.5% raw cornmeal, 2.5% added moisture, 0.5% vinegar (containing about 12% acetic acid), and 0.5% Nu-Rice® rice bran extract. Each composition was processed in a rotary head extruder of the type described above and a performance index was calculated.

The performance index is defined by the following equation:

$$\text{Performance Index } (PI) = \frac{\text{Number of Extruders} \times \text{Hours Running}}{\text{Number of Popcorn Events Detected}}$$

where a popcorn event is defined as the sound that is emitted when the extruder needs to be taken off line for inspection and/or cleaning. In some instances, build-up of the raw material at the rotor and stator and/or glazing of the material at the rotor and stator causes a "popcorn" sound which provides an audible indication that the process should be stopped so the rotor and stator can be cleaned.

It was found that the control sample exhibited a performance index of 16.5; whereas the exemplary composition containing the processing aid as described in this application exhibited a performance index of 36.0. This more than doubling of the performance index demonstrates that an extruder processing an extrudable composition containing the described processing aid may be operated for a substantially longer period of time before requiring any cleaning than an extruder processing an extrudable composition without the described processing aid.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

The invention claimed is:

1. An extruded random collet composition formed from an extrudable composition that consists essentially of:
   from about 80% to about 99% by weight of a raw material consisting of corn meal;
   an amount of moisture to provide from about 14.5% to about 18% by weight of the extrudable composition;
   from about 0.1% to about 2% of an edible emulsifier selected from rice extract, rice bran extract, and mixtures thereof and from about 0.01% to about 0.3% of acetic acid
   wherein the extruded random collet composition has a bulk density between about 4.5 lbs/ft$^3$ and 5.0 lbs/ft$^3$.

* * * * *